United States Patent [19]
Harms

[11] 3,731,118
[45] May 1, 1973

[54] VOLTAGE DETECTOR FOR SENSING AND DIGITALLY ENCODING STATES OF POTENTIAL

[75] Inventor: Wolf-Henning, Harms, Berlin, Germany

[73] Assignee: krone GmbH Berlin-Zehlendosb, Germany

[22] Filed: May 12, 1971

[21] Appl. No.: 142,534

[30] Foreign Application Priority Data

May 12, 1970   Germany.....................P 20 23 164.5

[52] U.S. Cl. ................307/255, 307/235, 307/297
[51] Int. Cl. ..............................................H03k 17/00
[58] Field of Search.....................307/255, 254, 235, 307/297

[56] References Cited
UNITED STATES PATENTS
2,975,305   3/1961   Pinet.................................307/255

Primary Examiner—John W. Huckert
Assistant Examiner—B. P. Davis
Attorney—Edwin E. Greigg

[57] ABSTRACT

In a detector for sensing four different states of potential applied to its input and for digitally encoding them at two detector outputs, there are provided two semiconductor components, each connected to the detector input and to one detector output; each semiconductor component is associated with a voltage divider, a reference source, a comparison source and a digital source. On either detector output there may appear either a logic 1 or a logic 0, allowing four possible digital signal pair combinations at the detector output, whereby each digital signal pair characterizes one state of potential applied to the detector input.

7 Claims, 3 Drawing Figures

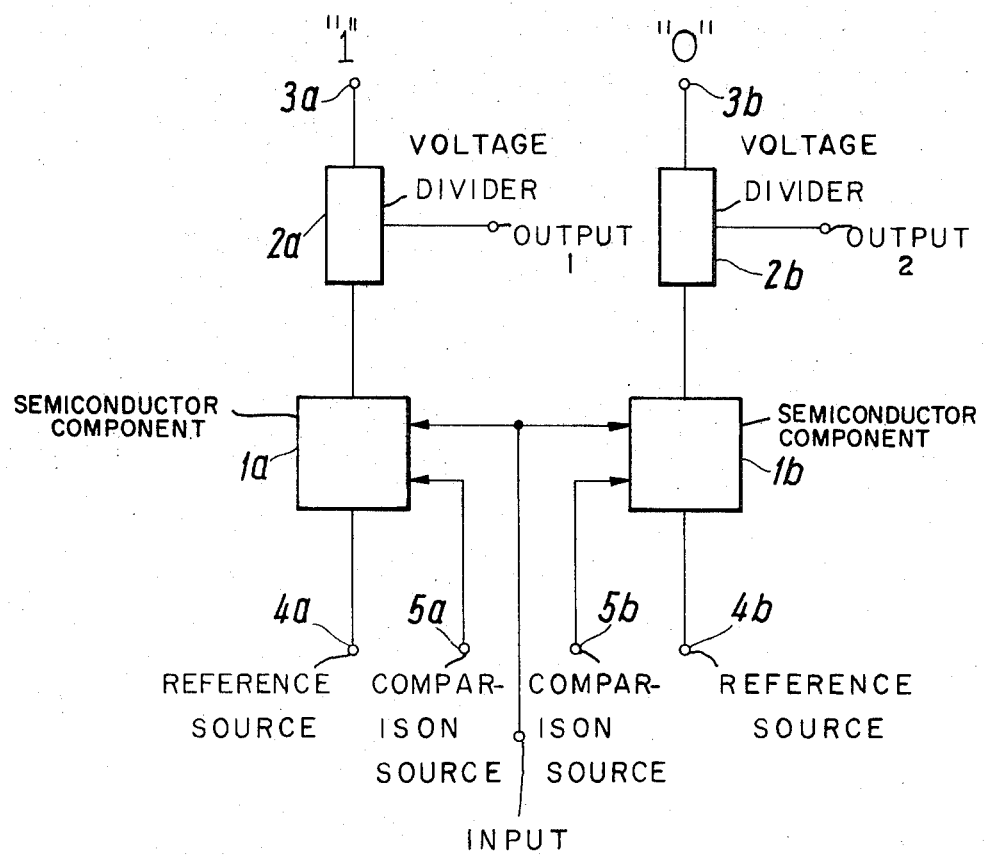

VOLTAGE DETECTOR FOR SENSING AND DIGITALLY ENCODING STATES OF POTENTIAL

OBJECT AND SUMMARY OF THE INVENTION

It is an object of the invention to provide an improved detector of the aforenoted type from which the disadvantages inherent in the use of relays is eliminated.

Briefly stated, according to the invention, the detector comprises semiconductor components, each connected by means of an associated two-part voltage divider to an associated digital source delivering a 1 or 0 potential, and to a reference source delivering a potential which corresponds to one of the states of potential and which is smaller than the 0 potential or, respectively, greater than the 1 potential. The ratio of resistances in each voltage divider is so designed that in case the associated semiconductor component is in a conductive state, the center tap of the voltage divider has an "0" or, respectively, an 1 potential. The center taps of the aforenoted two voltage dividers are directly connected to the one and the other output terminal of the detector. Each semiconductor component is placed into a blocking or a conductive state by means of the potential difference between the state of potential at the input and the potential at one of the comparison sources.

ADVANTAGES AND EXEMPLARY USES OF THE INVENTION

The use of semiconductor components in the detector has the advantage that the detection may be effected with components of high ohmic resistance, so that the detector will not interfere with the state of potential of the line connected to the detector input. In addition, the potentials to be detected may be arbitrarily large, while the necessary sensing periods will be extremely small. Further, semiconductor components, besides a very high switching speed, consume only an extremely small current. Due to the small current consumption, the power necessary to operate the detector is also very small. In addition, no inductivities are present, so that the negative effect they would have on the circuit connected to the detector input is eliminated.

The aforenoted semiconductor components may be transistors, thyristors (for regulating circuits), light-triggered phototransistors (for electron-optical circuits), or integrated semiconductor components for precision detection.

The detector according to the invention may find advantageous application in the scanning of telephone lines regarding their state of potential. It is noted that according to the standards of the German Federal Post Office Department, the connecting lines, or more precisely, the individual conductors may have not more than three different potentials. The invention is particularly well adapted to be used as a converter for switching characteristics to convert to digital signals the switching characteristics appearing in telephone conversations, particularly for the establishment of subscriber connections. These digital signals are subsequently transmitted through a time multiplex transmission line.

For such an application, the structure of the detector according to the invention may be simplified by providing that the semiconductor components are transistors and that the reference source of one transistor is at the same time the comparison source for both transistors.

It is further expedient to provide that the potential of the reference sources corresponds to the lowest state of potential whereby an exact threshold is reached only for this condition and that the digital sources transmit a 1 potential, whereby a direct control of the TTL components from this digital source may be directly achieved without transducer circuits.

BRIEF DESCRIPTION OF THE DRAWING

FIG. 2 is a block diagram illustrating the principles of a detector according to the invention and FIG. 3 is a circuit diagram of a preferred embodiment of the invention.

BACKGROUND OF THE INVENTION

This invention relates to a detector for the digital encoding, at two output terminals, of up to four different states of potential applied to its input terminal. To each output terminal there is applied, over separate switches associated with each output terminal, a logic 1 or a logic 0, dependent upon a comparison of the state of input potential with the potential of comparison sources corresponding to these four states of potential.

Detectors of the aforenoted type are adapted to supervise telephone and teletypewriter lines and regulating circuits used in regulating techniques.

Figure 1:
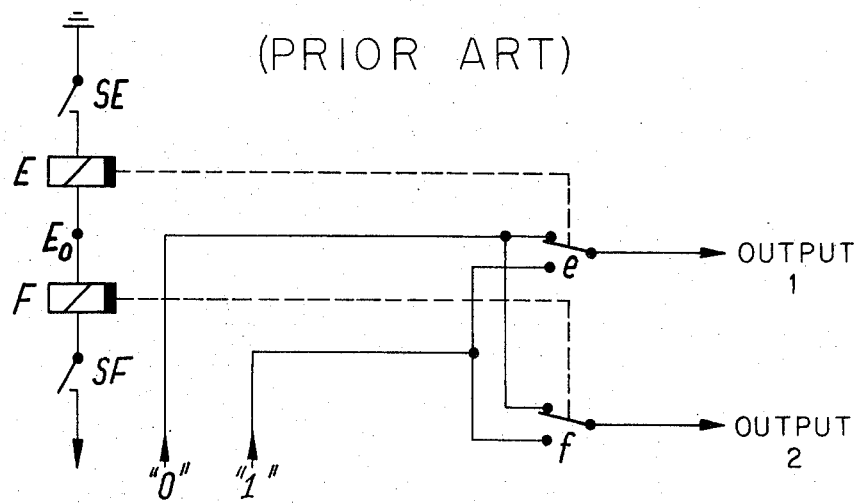
FIG. 1 is a circuit diagram of a detector according to the prior art.

A detector of the aforenoted known type is illustrated in FIG. 1 and may find application in supervising the state of potential of telephone lines wherein three different states of potential (negative potential, ground potential and floating ground or floating potential) may appear. Such a detector is also described in R. Fuhrer: "Landesfernwahl Geratetechnik," page 208.

As shown in FIG. 1, with an input terminal $E_o$ there are connected the coils of two electromagnetic relays E and F. To the relay F there is applied, through a switch SF, a negative potential of a comparison source (not shown), while the relay E is connected, through a switch SE, to the ground potential which serves here as positive potential. The relays E and F comprise respective relay contacts $e$ and $f$ which are directly connected to respective output terminals 1 and 2. Each relay contact $e$ and $f$ may be switched between two poles, of which one is connected with a potential source delivering a logic 1 and the other is coupled with a potential source delivering a logic 0.

It is apparent from FIG. 1 that the two switches SE and SF must not be simultaneously in a closed position because in such a case both relays would be energized continuously by virtue of a current flowing from the ground to the reference source of negative potential. For this reason, the switches SE and SF are controlled by beat pulses which are 90° out of phase and which are delivered by conventional beat generators, not shown.

In order to obtain signals simultaneously at the outputs 1 and 2 despite an alternating closing of the switches SE, SF (which results in an alternating detection of the input $E_o$ through the two relays E and F) the relays E, F are delayed response relays, that is, they remain in an attracted (energized) position for a certain duration, for example, for several pulse periods, even after opening of the respective switches SE or SF (i.e. even after the interruption of the current flowing through the respective relay).

The data in the table given below for the detector according to FIG. 1 will become readily apparent if it is considered that during current flow through the relays E or F, the respective relay contacts $e$ and $f$ are in a position opposite to that shown in FIG. 1.

| State of Input Potential | Output 1 | Output 2 |
| --- | --- | --- |
| Negative Potential | 1 | 0 |
| Positive Potential (Ground Potential) | 0 | 1 |
| Floating Potential | 0 | 0 |

The aforeoutlined detector has several disadvantages. Its delay of response is obviously quite significant because of the inertia of the mechanical contacts. Further, the relay resistance has to be relatively low because of technological reasons and because of the requirement to maintain the inductivity at a low value. Consequently, a detector of this type consumes substantial power and for this reason, as well as by virtue of the inductivity of the relay coils, the supervised line is interfered with in a significant degree.

OUTLINE, CHARACTERISTICS AND ADVANTAGES OF A PREFERRED EMBODIMENT OF THE INVENTION

According to a preferred embodiment of the invention — described in more detail later with reference to FIG. 3 — the first transistor is an n-p-n transistor and the second transistor is a p-n-p transistor and further, the input terminal is connected to the reference source associated with the first transistor through a resistance of high ohmic value. The input side terminal of said resistance is connected to the base of the first transistor, while the other terminal of said resistance is connected to the emitter of the first transistor. In this manner, the detector at the input side has a high ohmic value with respect to the lowest state of potential, whereby interferences with the lines to be detected may be prevented. Simultaneously, by virtue of the large voltage drop between the emitter and the base of the first transistor, a complete conductivity thereof is achieved.

According to the preferred embodiment, the input is connected with the digital source of the second transistor through a Zener diode and a third voltage divider. That terminal of the third voltage divider which is remote from the Z-diode is connected to the emitter of the second transistor and further, the center tap of the third voltage divider is connected with the base of the second transistor. The ratio of the third voltage divider is so selected that during the conductive state of the Z-diode, the base of the second transistor is negative with respect to the emitter. In this manner the switching threshold for the highest state of potential is determined alone by the Z-diode and for the other two states of potential there is sufficiently negative potential available at the center tap of the third voltage divider to ensure that the second transistor is rendered securely conductive.

It is further advantageous if the digital source of the second transistor transmits a 1 potential and that the Z-diode has a gating voltage which corresponds to the desired switching threshold for the highest state of potential and which has a magnitude that is at least identical to the 1 potential. In this manner there is ensured an exact switching threshold even for the highest state of potential. This, together with a high ohmic resistance at the input, contributes to a high input resistance of the detector.

The gating voltage of the Z-diode should have a magnitude equal at least to the 1 potential because of the following considerations:

The second transistor can close and thus deliver a 1 potential at the second output only when there is applied a potential to its base that is identical to, or more positive than the potential applied to its emitter. Thus, the latter is at a 1 potential applied, for example, through a resistance of the second voltage divider. Since a more positive potential cannot appear if the second output is closed with a very large ohmic resistance, it has to be ensured that at least the last-named 1 potential also appears at the base. Thus, in such a case there must be no current flow through the third voltage divider. Such a result is, however, achieved only if the Z-diode is in a blocking state up to the 1 potential. This is the condition for an 1 potential to appear at the base of the second transistor (and thus allowing it to assume its blocking state) through one half of the third voltage divider during application of the highest state of potential to the detector input.

It is noted that the potential at the emitter of the second transistor could be lowered by a voltage drop of $\Delta U_E$ across the already mentioned resistance of the second voltage divider by providing a coupling member of low ohmic resistance at the second output. In such a case the gating voltage of the Z-diode may be by $\Delta U_E$ lower than the 1 potential while a blocking of the second transistor would be still ensured. It is, however, a desideratum not to use any low-ohmic coupling members and therefore the blocking voltage should be fixed at the 1 potential. In such a case a secure blocking is always ensured and the coupling resistance may be of any desired value.

According to a further development of the invention, the first voltage divider is disposed between the collector of the first transistor and its associated digital source and further, one half of the second voltage divider is disposed between the digital source of the second transistor and the emitter thereof and the other half of the second voltage divider is disposed between the collector of the second transistor and the reference source associated therewith. In this manner, in case the highest state of potential prevails at the input, at the emitter of the second transistor there is securely obtained a potential which is somewhat more negative than that prevailing at the base, since the output current flows through the resistance of the second voltage divider disposed between the second digital source and the emitter and thus a voltage drop occurs. Consequently, the second transistor is securely blocked although no current may flow through the third voltage divider because of the Z-diode. As far as the first transistor is concerned, there is no need of a division of the first voltage divider, since a current flow is always possible from the input to the emitter of the first transistor and thus the emitter-base voltage conditions permit the first transistor to assume without difficulty either a blocking or a conductive state.

The aforeoutlined preferred embodiment may be simplified by omitting the second half of the second voltage divider, so that the emitter of the second transistor is directly connected to the reference source having a 0 potential. The last-named reference source is constituted by a readily available "0" potential source.

It is further expedient to connect the center tap of the first and the second voltage dividers to an 0 potential source through separate diodes. If, in such a structure, the highest state of potential equals the ground potential, the diodes prevent an inadvertent application of a negative potential to the two output terminals. Such an occurrence (i.e. the application of a negative potential) cannot be tolerated in case a transistor-transistor-logic (TTL) circuit is coupled to both outputs. According to data sheets of TTL components (see, for example, Texas Instrument Series SN 74), the latter must be controlled exclusively with positive voltages, since negative voltages would cause their immediate destruction.

In view of the foregoing, the use of a detector built in the aforeoutlined manner permits a direct control of integrated TTL circuits.

DESCRIPTION OF AN EMBODIMENT ILLUSTRATING THE PRINCIPLES OF THE INVENTION

Turning now to FIG. 2, there is shown a block diagram of a detector for digital encoding according to the invention.

Two semiconductor components $1a$ and $1b$ are each connected to a detector input to which the states of potential to be sensed are applied. Each semiconductor switch $1a$, $1b$ is further connected through a respective two-part voltage divider $2a$ and $2b$ to respective digital sources $3a$ and $3b$, which deliver a logic 1 and a logic 0 potential, respectively. The center taps of each two-part voltage divider $2a$ and $2b$ constitute a respective output 1 and 2 of the detector.

Each semiconductor component $1a$ and $1b$ is further connected to a respective reference source $4a$ and $4b$ having a fixed potential and to a respective comparison source $5a$ and $5b$, also having a fixed potential.

The switching state of the semiconductor switches $1a$ and $1b$ thus depends upon the potential difference between the input on the one hand, and the associated respective comparison sources $5a$ and $5b$, on the other hand.

It may be directly observed from FIG. 2 that in case of a blocked semiconductor switch $1a$ or $1b$, the logic potential of the associated digital source $3a$ or $3b$ is applied through the voltage divider $2a$ or $2b$ to the output 1 or 2.

In case the semiconductor components $1a$ and $1b$ are in a conductive state, the potential difference between the reference source $4a$ or $4b$ and the digital source $3a$ or $3b$ is applied to the associated output 1 or 2 through the associated voltage divider $2a$ or $2b$. Consequently, the ratio of resistances in the voltage dividers $2a$ and $2b$ and the potential of the reference sources $4a$ and $4b$ have to be selected in such a manner that even in a conductive state of the semiconductor components there prevails a logic potential which is opposed to the logic potential of the associated digital sources $3a$ or $3b$, respectively.

If thus, for example, the digital source $3a$ delivers a logic 1 potential and, in a blocking state of the semiconductor component $1a$ this potential is applied through the center tap of the voltage divider $2a$ to the output 1, then during the conductive state of the semiconductor switch $1a$, at the output 1 there must appear a logic potential 0 by virtue of the cooperation of the digital source $3a$, the reference source $4a$, and the voltage divider $2a$ (the resistance of the semiconductor component $1a$ is neglected in the conductive state). Thus, in this case, the potential of the reference source $4a$ has to be below the logic potential 0. It is noted that if the digital source $3a$ delivered an 0 potential then, accordingly, the reference source $4a$ should be at a potential which is greater than the 1 potential.

It is further readily apparent from FIG. 2 that because of the two outputs 1 and 2 which each may receive two different logic potentials, there are possible a total of four different potential combinations at the outputs 1 and 2, so that four different states of potential may be sensed at the input of the detector according to the invention.

It will be apparent that if further semiconductor components are connected to the detector input together with associated comparison sources, reference sources, voltage dividers, digital sources and outputs, it is possible to increase the number of potential states that may be sensed at the detector input. Based on simple mathematical considerations, the number of potential states detectable at the input is by 2 higher than the number of the detector outputs.

DESCRIPTION OF THE PREFERRED EMBODIMENT

Figure 3:
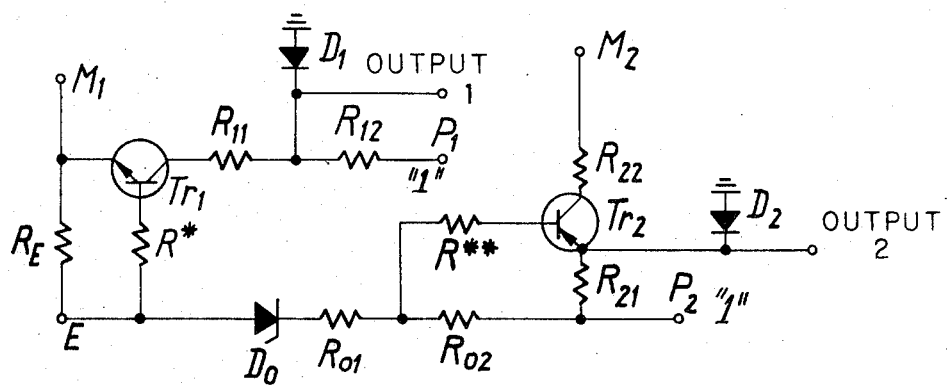

Turning now to the embodiment depicted in FIG. 3 and already outlined earlier in the specification, it is assumed that at the input E of the detector there may appear three different states of potential, namely, a negative potential, a ground potential, and a floating ground or floating potential.

The detector comprises an n-p-n transistor $Tr_1$ and a p-n-p transistor $Tr_2$, both functioning as switching components. With the transistor $Tr_1$ there is associated a first voltage divider formed of two resistances $R_{11}$, $R_{12}$ and connected to the collector of the resistor $Tr_1$ and a first digital source $P_1$ having a 1 potential of approximately + 5 Volts. The center tap of the voltage divider $R_{11}$, $R_{12}$ is connected to an output 1.

The emitter of the transistor $Tr_1$ is connected with a reference source $M_1$ having a negative potential. In this embodiment the reference source $M_1$ also serves as a comparison source for comparing the state of potential momentarily prevailing at the input E in order to control the transistors $Tr_1$ and $Tr_2$.

Similarly, with the second transistor $Tr_2$ there is associated a second voltage divider formed of resistances $R_{21}$ and $R_{22}$. The resistance $R_{22}$ is connected to the collector of the transistor $Tr_2$ and a reference source $M_2$ having a negative potential, while the resistance $R_{21}$ is connected to the emitter of the transistor $Tr_2$ and a second digital source $P_2$ having a 1 potential. The center tap of the second voltage divider which, in case of a negligible impedance of the emitter-collector leg of the transistor $Tr_2$ in a conductive state coincides with the emitter thereof, is connected to an output 2 of the detector.

Normally, $P_1$ and $P_2$ are connected with one another and a common digital source of +5 V. A separation of $P_1$ and $P_2$ has significance only in a case when the output 1 is in a digital circuit which requires input voltages other than that applied to the output 2. Thus, for example, there are switching circuits of the HLL family (High Level Logic) which require + 15 V for the 1 potential.

The ratio of resistances in the first and second voltage dividers $R_{11}$, $R_{12}$ and $R_{21}$, $R_{22}$, respectively, are selected in such a manner that in the conductive state of the associated transistor $Tr_1$ and $Tr_2$, respectively there appears at the center tap a logic 0 potential which in this instance is equal to the ground potential. In order to compensate for possible small negative deviations from the exact 0 potential and thus protect a coupled TTL circuit from a resulting destruction, there are provided diodes $D_1$ and $D_2$ through which the respective outputs 1, 2 are grounded.

The input E is, on the one hand, connected through a resistance $R_E$ to the emitter of the transistor $Tr_1$ and, on the other hand, through a Zener-diode $D_0$ and a third voltage divider $R_{01}$, $R_{02}$ to the second digital source $P_2$ and to the resistance $R_{21}$ of the second voltage divider. Resistances R* and R** are the base resistances of the two transistors $Tr_1$ and $Tr_2$, respectively.

The ratio of resistances in the third voltage divider $R_{01}$, $R_{02}$ is selected in such a manner that in the conductive state of the Z-diode $D_0$, there appears at the base of the second transistor $Tr_2$ a voltage which is negative with respect to its emitter, so that the transistor $Tr_2$ is in a conductive state.

OPERATION OF THE PREFERRED EMBODIMENT

In the description that follows there is set forth the operation of the detector according to FIG. 3 for the three states of potential at the input E, namely negative potential, ground potential, and floating ground and floating potential.

1. Negative potential applied to input E.

Across the resistance $R_E$ there is no voltage drop, so that the transistor $Tr_1$ is blocked and at the output 1 there prevails a 1 potential applied through the resistance $R_{12}$. At the Z-diode $D_0$ there is a blocking voltage drop of, for example, |5 V|. The remaining potential difference between the negative potential at the input and the 1 potential at the digital source $P_2$ is divided between the resistances $R_{01}$ and $R_{02}$ of the third voltage divider in such a manner that at the base of the transistor $Tr_2$ there prevails a voltage which is negative with respect to its emitter, so that the transistor $Tr_2$ is placed in a conductive state. Then, at the center tap of the second voltage divider there prevails, by definition, approximately zero Volts or ground potential, that is, an 0 potential, which is forwarded to the output 2. The exact setting of the 0 potential is effected by the diode $D_2$ which is weakly conductive for negative voltages. In this manner, a component particularly a TTL circuit connected to the output 2 is protected from negative potentials.

2. Ground potential applied to the input E.

In this instance, the entire negative potential drops across the resistance $R_E$. As a result, the transistor $Tr_1$ is rendered conductive and thus applies to the first voltage divider $R_{11}$, $R_{12}$ a voltage which is between the 1 potential and the negative potential. By definition, an 0 potential appears at the center tap of the first voltage divider and the output 1. A TTL circuit connected to the output 1 is protected from negative potentials by the diode $D_2$.

Since at the input E there prevails a ground potential, the Z-diode $D_0$ is fully blocked, so that at the base of the transistor $Tr_2$ as well as on its emitter there appears a positive potential supplied by the second digital source $P_2$ while current flows from the digital source $P_2$ through the resistance $R_{21}$ to the output 2 where it generates a voltage drop. Consequently, the transistor $Tr_2$ is blocked, so that at output 2 there appears a 1 potential applied across the resistance $R_{21}$.

3. Floating ground and floating potential prevailing at input E.

In this case, a current flows from the reference source $M_1$ to the second digital source $P_2$ through the resistance $R_E$, the Z-diode $D_0$, and the third voltage divider $R_{01}$, $R_{02}$. By virtue of the voltage drop across the resistance $R_E$, the base of the first transistor $Tr_1$ is more positive than its emitter, so that the transistor $Tr_1$ becomes conductive and, as already set forth hereinabove, it transmits an 0 potential to the output 1. The current flowing from the reference source $M_1$ to the second digital source $P_2$ effects such a voltage drop across the third voltage divider $R_{01}$, $R_{02}$, that its center tap and thus also the base of the transistor $Tr_2$, will have a negative potential, so that the transistor $Tr_2$ will become conductive. As a result, at the output 2 again an 0 potential appears.

In view of the foregoing, the following table may be set up for the detector shown in FIG. 3:

| State of Potential at Input E | Output 1 | Output 2 |
| --- | --- | --- |
| Negative Potential | 1 | 0 |
| Ground Potential | 0 | 1 |
| Floating Ground and Floating Potential | 0 | 0 |

The resistance $R_E$ determines the input resistance of the detector with respect to the negative potential, while the Z-diode $D_0$ and the third voltage divider $R_{01}$, $R_{02}$ determines the input resistance with respect to the ground. If the input resistance is to be of a high ohmic value, then $R_E$, $R_{01}$ and $R_{02}$ all have a large resistance. Further, the Z-diode $D_0$ determines the switching threshold in which the detector recognizes the "ground potential". For reasons set forth in the introduction, its blocking voltage in the present case (1 potential equals 5 V) should be at least 5 V, since the higher the blocking voltage, the greater is the voltage range in which the scanning device reports a "ground potential". Its upper value is determined by the requirement that between the two resistances $R_{01}$ and $R_{02}$ of the third voltage divider, there should remain a negative potential to permit the control of the transistor $Tr_2$.

The range in which the detector reports a "negative potential" may be set by means of an external adjustment effected at $M_1$. Normally, the detector reports a "negative potential" only when at the input E there prevails a potential which is either equal to or more negative than that at $M_1$. By raising or lowering the negative potential at $M_1$ by voltage divider circuits, the switching threshold for the "negative potential" may be raised or lowered to the same extent.

What is claimed is:

1. A detector for sensing and digitally encoding a plurality of states of potentials applied to a signal input thereof comprising, in combination:
   a. a plurality of semiconductor components, each component having first, second and third terminal means, and a signal input terminal means, each of said signal input terminal means being coupled to said signal input for applying the states of potential to be encoded to each said semiconductor component;
   b. a plurality of digital signal sources delivering digital 1 and digital 0 potentials, each of said first terminal means being coupled respectively to a respective one of said digital sources;
   c. a plurality of reference sources delivering potentials smaller than the 0 potential and greater than the 1 potential, each said second terminal means being coupled respectively to a respective one of said reference sources;
   d. a plurality of comparison sources delivering potentials with which the states of potential applied to said signal input are compared, each said third terminal means being coupled respectively to a respective one of said comparison sources for placing selectively each said semiconductor component into a conductive and blocking state in response to the difference of potential between the particular state of potential being applied to said signal input and the potential supplied from respective ones of said comparison sources;
   e. a plurality of voltage dividers, each voltage divider being positioned in a respective current path which includes a respective said first terminal means and a respective said third terminal means and each voltage divider having a tap; and
   f. a plurality of output terminals, each output terminal being coupled to a respective one of said taps.

2. A detector as defined in claim 1, wherein said semiconductor components are two in number and comprise respectively a first and a second transistor and wherein said reference source associated with said first transistor comprises said comparison sources for both transistors.

3. A detector as defined in claim 2, wherein the potential of said reference sources corresponds to the lowest one of said states of potential and all said digital sources deliver a 1 potential.

4. A detector as defined in claim 3, wherein said first transistor is an n-p-n transistor and said second transistor is a p-n-p transistor; and said detector includes:
   a resistance of high ohmic value having a first end connected to said signal input and to the base of said first transistor and a second end connected to the emitter of said first transistor and to the reference source associated therewith,
   a Zener diode connected to said signal input, and
   an additional voltage divider having one end connected to said Zener diode and another end connected to the digital source associated with said second transistor and to the emitter of said second transistor; and wherein said additional voltage divider is formed of two resistances coupled to a center tap which is connected to the base of said second transistor and the ratio of resistances in said additional voltage divider is such that in the conductive state of said Zener diode, the base of said second transistor is negative with respect to the emitter thereof.

5. A detector as defined in claim 4, wherein the digital source associated with said second transistor has a 1 potential and said Zener diode has a gating voltage corresponding to the desired switching threshold for the highest state of potential, said gating voltage being at least identical to the 1 potential.

6. A detector as defined in claim 5, wherein the voltage divider associated with said first transistor is connected at one end to the collector of said first transistor and at the other end to the digital source associated with said first transistor; one resistance of the voltage divider associated with said second transistor is connected to the digital source associated with said second transistor and to the emitter thereof; and the other resistance of the last-named voltage divider is connected to the collector of the second transistor and to the reference source associated therewith.

7. A detector as defined in claim 2, further comprising a first diode and a second diode; and wherein the taps of said voltage dividers associated with said first and said second transistors are connected to a zero reference potential point through the respective said first and said second diodes.

* * * * *